(12) United States Patent
Wilkosz et al.

(10) Patent No.: US 12,154,341 B2
(45) Date of Patent: Nov. 26, 2024

(54) MONITORING SYSTEM AND METHOD FOR IDENTIFYING A CHANGED OBJECT OF INTEREST USING AN ACCESS CONTROL SYSTEM

(71) Applicant: MOTOROLA SOLUTIONS, INC., Chicago, IL (US)

(72) Inventors: Pawel Wilkosz, Wisniowa (PL); Grzegorz Gustof, Myslenice (PL); Marcin Kalinowski, Cracow (PL); Lukasz Osuch, Pszczyna (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 372 days.

(21) Appl. No.: 17/654,197

(22) Filed: Mar. 9, 2022

(65) Prior Publication Data
US 2023/0290150 A1    Sep. 14, 2023

(51) Int. Cl.
*G06V 20/52*    (2022.01)
*G06T 7/215*    (2017.01)
(Continued)

(52) U.S. Cl.
CPC .............. *G06V 20/52* (2022.01); *G06T 7/215* (2017.01); *G06T 7/292* (2017.01); *G06T 7/73* (2017.01)

(58) Field of Classification Search
CPC .... G06V 20/52; G06V 10/245; G06V 40/172; G06V 40/16; G06V 40/15; G06V 20/44;
(Continued)

(56) References Cited

U.S. PATENT DOCUMENTS 9,064,394 B1 * 6/2015 Trundle ........... G08B 13/19684
9,392,573 B2    7/2016 Krattiger et al.
(Continued)

FOREIGN PATENT DOCUMENTS

CA          3061084 A1      5/2020
CN        106507313 B      10/2019
(Continued)

OTHER PUBLICATIONS

International Search Report and Written Opinion for Application No. PCT/US2023/062072 dated May 22, 2023 (15 pages).

*Primary Examiner* — Negussie Worku
(74) *Attorney, Agent, or Firm* — Michael Best & Friedrich LLP (57) ABSTRACT

Monitoring systems and methods for identifying an object of interest after the object of interest has undergone a change in appearance. One example provides an image sensor is configured to monitor a first area. A first electronic processor is configured to detect a first appearance of an object of interest within the first area, and determine a visual characteristic of the object of interest. The first electronic processor is configured to receive a first notification indicative of movement of the object of interest into a second area and an access input, and associate the visual characteristic of the object of interest with the access input. The first electronic processor is configured to detect a second appearance of the object of interest within the first area, and update the visual characteristic of the object of interest based on the second appearance of the object of interest.

15 Claims, 9 Drawing Sheets

(51) Int. Cl.
*G06T 7/292* (2017.01)
*G06T 7/73* (2017.01)

(58) Field of Classification Search
CPC ...... G06V 40/168; G06V 40/28; G06V 20/59;
G06V 40/166; G06V 20/56; G06V 40/20;
G06V 20/593; G06V 20/54; G06V 20/58;
G06V 20/10; G06V 10/147; G06V 10/82;
G06V 10/96; G06V 20/46; G06V 10/24;
G06V 10/25; G06V 10/95; G06V 20/41;
G06V 20/53; G06V 2201/07; G06V
40/10; G06V 10/40; G06V 10/462; G06V
10/764; G06V 10/774; G06V 10/98;
G06V 20/40; G06V 2201/10; G06V
40/12; G06V 40/171; G06V 40/18; G06V
10/14; G06V 10/44; G06V 10/454; G06V
10/473; G06V 10/806; G06V 10/809;
G06V 20/70; G06V 40/174; G06V 40/23;
G06V 10/141; G06V 10/143; G06V
10/22; G06V 10/74; G06V 10/757; G06V
10/7715; G06V 10/803; G06V 20/17;
G06V 20/20; G06V 20/64; G06V 40/103;
G06V 40/161; G06V 40/162; G06V
40/164; G06V 40/173; G06V 40/70;
H04N 7/181; H04N 7/186; H04N 7/188;
H04N 7/18; H04N 7/185; H04N
21/41422; H04N 21/43615; H04N 7/183;
H04N 23/661; H04N 21/2225; H04N
21/2265; H04N 21/2393; H04N
21/25816; H04N 21/43637; H04N
21/454; H04N 21/6408; H04N 21/64322;
H04N 21/654; H04N 23/45; H04N 23/56;
H04N 23/60; H04N 23/62; H04N 23/632;
H04N 23/651; H04N 23/69; H04N
23/695; H04N 5/91; H04N 21/2743;
H04N 21/2747; H04N 21/4131; H04N
23/61; H04N 23/66; H04N 23/90; H04N
5/33; H04N 5/76; H04N 23/50; H04N
23/55; H04N 23/631; H04N 23/698;
H04N 5/04; H04N 17/002; H04N 21/252;
H04N 21/2668; H04N 21/41265; H04N
21/4532; H04N 21/4788; H04N 21/6582;
H04N 21/812; H04N 21/8549; H04N
23/00; H04N 23/51; H04N 23/63; H04N
23/667; H04N 23/741; H04N 23/80;
H04N 25/57; H04N 25/59; H04N 25/75;
H04N 25/771; H04N 5/144; H04N 5/765;
H04N 5/77; H04N 5/775; H04N 7/147;
H04N 9/8205; H04N 9/8715; G06T
2207/10016; G06T 19/006; G06T 15/20;
G06T 15/30; G06T 19/20; G06T
2207/30232; G06T 2219/2012; G06T
2219/2021; G06T 7/246; G06T
2207/30201; G06T 7/20; G06T
2207/20081; G06T 7/292; G06T
2207/20084; G06T 7/00; G06T 7/60;
G06T 2207/30236; G06T 7/11; G06T
15/10; G06T 17/05; G06T 19/00; G06T
2200/24; G06T 2207/10024; G06T
2207/10028; G06T 2210/21; G06T 5/50;
G06T 7/248; G06T 7/70; G06T 2200/04;
G06T 2207/10004; G06T 2207/10048;
G06T 2207/20201; G06T 2207/30168;
G06T 2207/30196; G06T 2207/30252;
G06T 2207/30268; G06T 3/4053; G06T
3/4061; G06T 3/4076; G06T 5/20; G06T
5/73; G06T 7/0002; G06T 7/136; G06T
7/174; G06T 7/231; G06T 7/30; G06T
7/50; G06T 7/521; G06T 7/73; G06T
7/80; G06T 7/90; G06T 7/97; G01J
1/0266; G01J 1/0295; G01J 1/02; G01J
1/0407; G01J 1/4204; G01J 1/4228; G01J
5/0025; G01J 4/04
USPC .................................................. 358/482, 514
See application file for complete search history.

(56) References Cited

U.S. PATENT DOCUMENTS

| | | | |
|---|---|---|---|
| 9,911,198 B2* | 3/2018 | Pham | G06V 10/56 |
| 9,948,902 B1* | 4/2018 | Trundle | G06V 20/52 |
| 10,735,675 B2* | 8/2020 | Buckler | H04N 25/445 |
| 11,335,210 B2* | 5/2022 | Wexler | G09B 21/006 |
| 11,640,671 B2* | 5/2023 | Chiam | G06F 18/22 |
| | | | 382/103 |
| 11,719,677 B1* | 8/2023 | Conway | G01N 33/0075 |
| | | | 73/31.02 |
| 11,854,266 B2* | 12/2023 | Nadler | G06V 20/52 |
| 2007/0008099 A1 | 1/2007 | Kimmel et al. | |
| 2010/0214408 A1* | 8/2010 | McClure | G06V 10/255 |
| | | | 348/143 |
| 2012/0169882 A1* | 7/2012 | Millar | G08B 13/19608 |
| | | | 348/E7.086 |
| 2015/0154850 A1 | 6/2015 | Fadell et al. | |
| 2016/0062630 A1* | 3/2016 | Anzures | G06F 3/04845 |
| | | | 715/739 |
| 2021/0142601 A1 | 5/2021 | Schoenfelder et al. | |
| 2022/0292695 A1 | 9/2022 | Chiam et al. | |
| 2023/0119771 A1* | 4/2023 | Brimhall | H04N 23/631 |
| | | | 345/419 |
| 2023/0290150 A1* | 9/2023 | Wilkosz | G06T 7/215 |

FOREIGN PATENT DOCUMENTS

| | | |
|---|---|---|
| EP | 3312762 A1 | 4/2018 |
| EP | 3699873 A1 | 8/2020 |

* cited by examiner

FIG. 9

MONITORING SYSTEM AND METHOD FOR IDENTIFYING A CHANGED OBJECT OF INTEREST USING AN ACCESS CONTROL SYSTEM

BACKGROUND OF THE INVENTION

Video cameras are used to monitor buildings and facilities. In many instances, video cameras provide live video feeds to a security system, which is often monitored by security personnel. Security personnel monitor the video feeds to identify activity that may require intervention, for example, the presence of a person who does not appear to be authorized to enter a building or the removal of property from a facility that does not appear to be an authorized removal.

Security at a facility may also be enhanced through the use of access control systems. Access control systems are electronic systems that facilitate automated approval of individuals to enter through doors or other portals without the need for a security officer to review and validate the credentials of an individual entering the portal. Typically, access control systems include readers that read or scan, for example, identification cards or biometric characteristics of individuals attempting to access or traverse a portal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate examples and aspects of concepts that include the claimed subject matter, and explain various principles and advantages of those examples and aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples and aspects explained.

The apparatus and method components have been represented where appropriate by conventional symbols in the drawings, showing only those specific details that are pertinent to understanding the examples explained so as not to obscure the disclosure with details that will be readily apparent to those of ordinary skill in the art having the benefit of the description herein.

DETAILED DESCRIPTION OF THE INVENTION

Manual video monitoring is increasingly being replaced by automated live feed monitoring. Automated monitoring systems increase the accuracy of detecting security threats while reducing the manpower needed to monitor facilities. These monitoring systems use image recognition techniques to identify objects of interests in the live feeds and to track the objects of interests across the locations within the facility.

In some situations, however, a person of interest may leave the area monitored by the monitoring system. In one example, a person of interest enters a building that does not include live feed monitoring. While in the unmonitored area, the person of interest may change their appearance, such as changing a piece of clothing (for example, removes a winter jacket, puts on a hat, and the like). When the person of interest re-enters the monitored area, the system can no longer identify that the person with a different appearance is the same person that entered the building previously.

Accordingly, there is a need for monitoring systems and methods for identifying an object of interest after the object of interest has undergone a change in appearance.

One example provides a monitoring system including an image sensor and a first electronic processor configured to be coupled to the image sensor. The image sensor is configured to monitor a first area. The first electronic processor is configured to detect, using the image sensor, a first appearance of an object of interest within the first area, and determine a visual characteristic of the object of interest. The first electronic processor is configured to receive a first notification indicative of movement of the object of interest into a second area and an access input, and associate the visual characteristic of the object of interest with the access input. The first electronic processor is configured to receive a second notification indicative of movement of the object of interest out of the second area to the first area. The first electronic processor is configured to detect, using the image sensor, a second appearance of the object of interest within the first area, and update the visual characteristic of the object of interest based on the second appearance of the object of interest.

Another example provides a monitoring system including an image sensor, an access control system, and a first electronic processor configured to be coupled to the image sensor. The image sensor is configured to monitor a first area. The access control system is configured to provide access to a second area in response to receiving an access input. The first electronic processor is configured to detect, using the image sensor, a first appearance of an object of interest within the first area, and determine a visual characteristic of the object of interest. The first electronic processor is configured to establish a communication link to the access control system. The first electronic processor is configured to receive a first notification indicative of movement of the object of interest into the second area and the access input, and associate the visual characteristic of the object of interest with the access input. The first electronic processor is configured to receive a second notification indicative of movement of the object of interest out of the second area to the first area. The first electronic processor is configured to detect, using the image sensor, a second appearance of the object of interest within the first area, and update the visual characteristic of the object of interest based on the second appearance of the object of interest.

Another example provides a method of monitoring an object of interest. The method includes detecting, using an image sensor, a first appearance of an object of interest within a first area, and determining a visual characteristic of the object of interest. The method includes receiving a first notification indicative of movement of the object of interest into a second area and an access input, and associating the visual characteristic of the object of interest with the access input. The method includes receiving a second notification indicative of movement of the object of interest out of the second area to the first area. The method includes detecting, using the image sensor, a second appearance of the object of interest within the first area, and updating the visual characteristic of the object of interest based on the second appearance of the object of interest.

Figure 1:
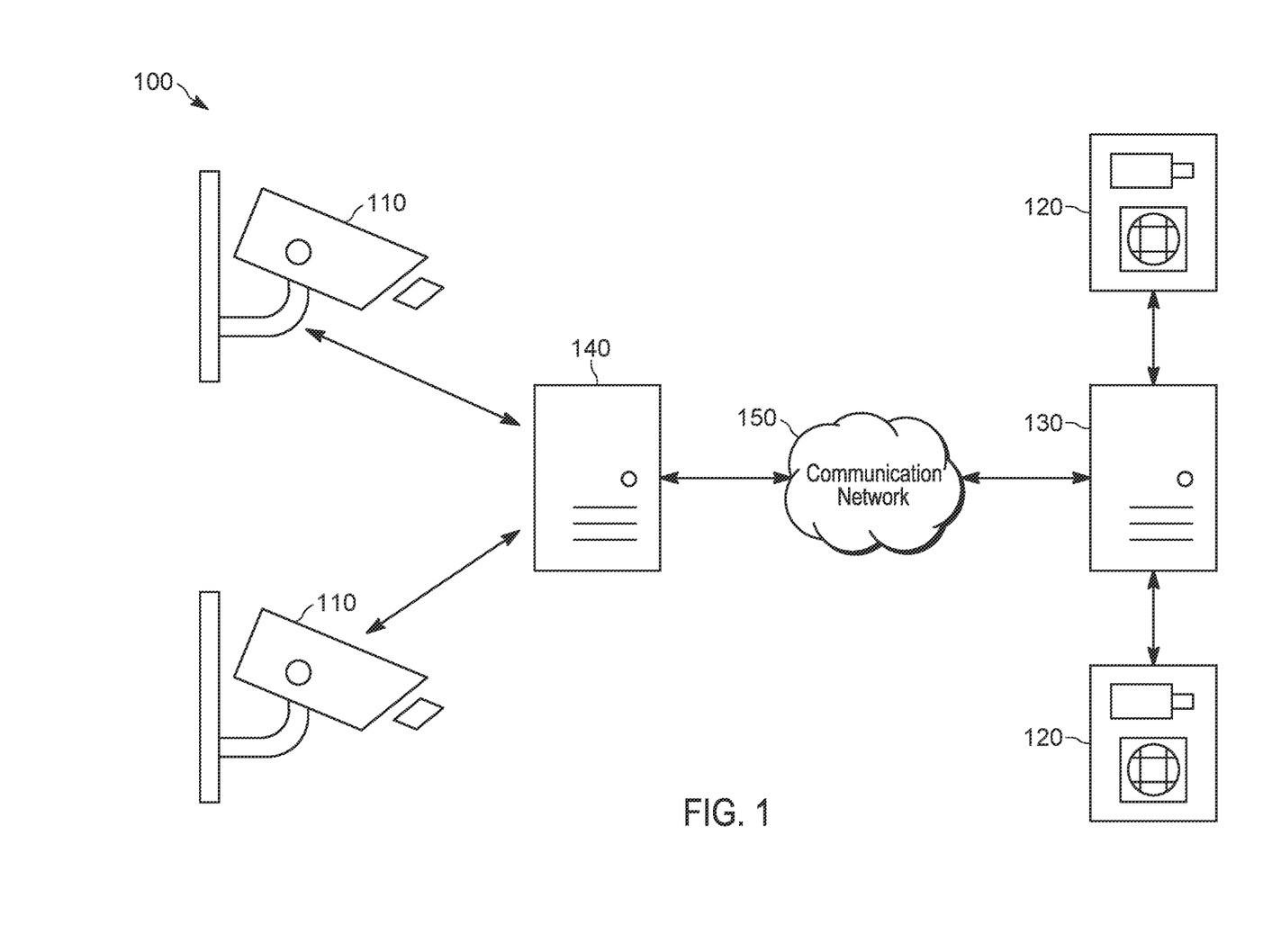
FIG. 1 is a block diagram of a monitoring system in accordance with some examples.

With reference to FIG. 1, a monitoring system 100 for a monitored area includes a plurality of image sensors 110 (for example, one or more image sensors 110) for tracking objects of interest in the monitored area, a monitoring server 140, a plurality of access devices 120, and an access control server 130 (for example, an access control system). The monitoring server 140 communicates with the plurality of image sensors 110. The access control server 130 communicates with the plurality of access devices 120. The monitoring server 140 and the access control server 130 communicate over a communication network 150. The monitoring system 100 may include more or fewer components than those illustrated in FIG. 1 and may perform additional functions other than those described herein. The monitoring server 140 and the access control server 130 may be computing devices implemented in a cloud infrastructure or located at a monitoring facility or other location. The monitoring facility is, for example, a monitoring control room of a facility such as a security room of a shopping mall, a movie theater, an airport, a commercial building, or the like. The communication network 150 is, for example, a WiFi® network, a cellular network, or the like, or a combination of one or more wired networks and/or one or more wireless networks.

Figure 2:
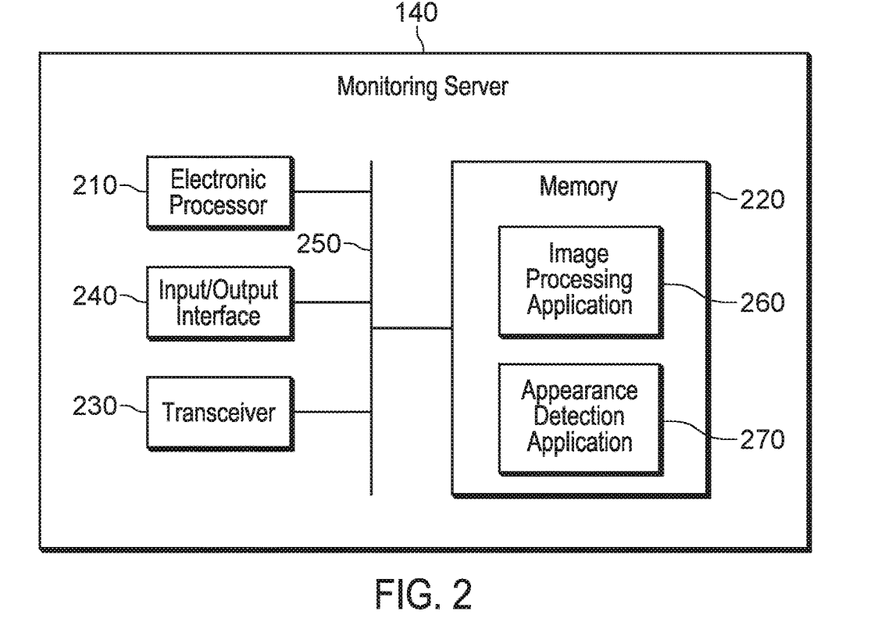
FIG. 2 is a block diagram of a monitoring server of the monitoring system of FIG. 1 in accordance with some examples.

FIG. 2 is a block diagram of one example of the monitoring server 140. In the example illustrated, the monitoring server 140 includes an electronic processor 210 (for example, a first electronic processor), a memory 220 (for example, a first memory), a transceiver 230 (for example, a first transceiver), and an input/output interface 240 (for example, a first input/output interface). The electronic processor 210, the memory 220, the transceiver 230, and the input/output interface 240 communicate over one or more control and/or data buses (for example, a communication bus 250). FIG. 2 illustrates only one example of the monitoring server 140. The monitoring server 140 may include more or fewer components and may perform functions other than those explicitly described herein.

In some examples, the electronic processor 210 is implemented as a microprocessor with separate memory, such as the memory 220. In other examples, the electronic processor 210 may be implemented as a microcontroller (with memory 220 on the same chip). In other examples, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the monitoring server 140 described herein. The memory 220 may include, for example, a program storage area and a data storage area. The program storage area and the data storage area may include combinations of different types of memory, such as read-only memory and random-access memory. In some examples, the monitoring server 140 may include one electronic processor 210, and/or a plurality of electronic processors 210 in a cloud computer cluster arrangement, one or more of which may be executing none, all, or a portion of the applications of the monitoring server 140 provided below, sequentially or in parallel across the one or more electronic processors 210. The one or more electronic processors 210 comprising the monitoring server 140 may be geographically co-located or may be separated by inches, meters, kilometers or miles, and interconnected via electronic and/or optical interconnects. One or more proxy servers or load balancing server may control which one or more electronic processors 210 perform any part or all of the applications provided below.

The transceiver 230 enables wired and/or wireless communication of the monitoring server 140 with the plurality of image sensors 110 and the access control server 130 over the communication network 150. In some examples, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

The memory 220 stores applications that are executed by the electronic processor 210. In the example illustrated, the memory 220 stores an image processing application 260 and an appearance detection application 270. The image processing application 260 is executed to perform an appearance search to analyze image and/or video files to identify objects or persons of interest. In some examples, the objects or persons of interest are identified based on facial recognition or image recognition techniques. In other examples, the image processing application 260 identifies clothing or other visual characteristics of the objects or persons of interest. The appearance detection application 270 is executed in conjunction with the image processing application 260 to identify suspected objects of interest (including persons of interest) as further described with respect to the methods below. The electronic processor 210 executes the image processing application 260 and the appearance detection application 270, among other applications stored in the memory 220, to perform the methods described herein.

In the example illustrated in FIG. 2, a single device is illustrated as including all the components and the applications of the monitoring server 140. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the monitoring server 140 are implemented in a cloud infrastructure accessible through several terminal devices, with the processing power located at a server location. In another example, the components and applications of the monitoring server 140 may be divided between separate monitoring facility computing devices co-located at a monitored facility of the monitored area. In yet another example, the components and applications of the monitoring server 140 may be divided between separate computing devices not co-located with each other but communicatively connected with each other over a suitable communication network.

Figure 3:
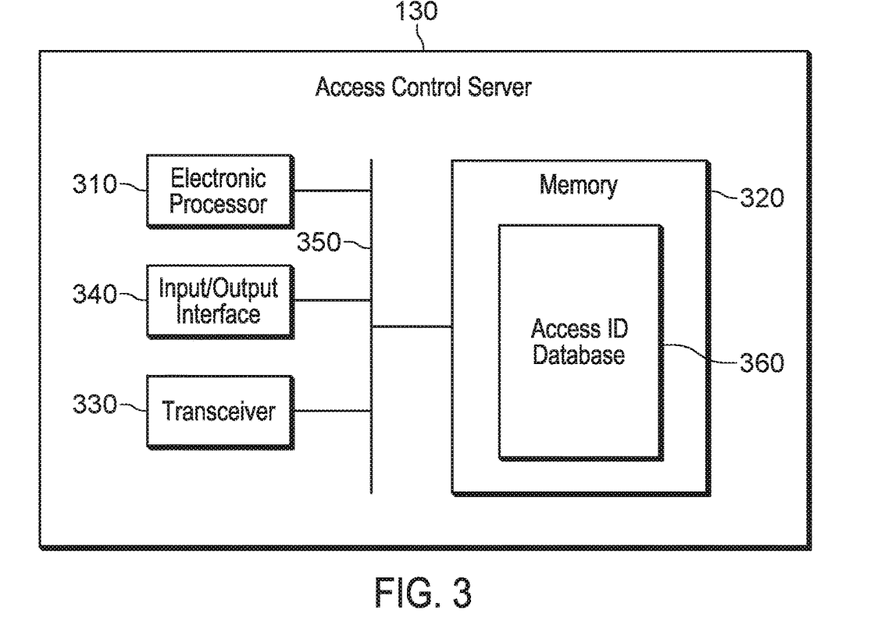
FIG. 3 is a block diagram of an access control server of the monitoring system of FIG. 1 in accordance with some examples.

FIG. 3 is a block diagram of one example of the access control server 130. In the example illustrated, the access control server 130 includes an electronic processor 310 (for example, a second electronic processor), a memory 320 (for example, a second memory), a transceiver 330 (for example, a second transceiver), and an input/output interface 340 (for example, a second input/output interface). The electronic processor 310, the memory 320, the transceiver 330, and the input/output interface 340 communicate over one or more control and/or data buses (for example, a second communication bus 350). FIG. 3 illustrates only one example of the access control server 130. The access control server 130 may include more or fewer components and may perform functions other than those explicitly described herein.

In some examples, the electronic processor 310 is implemented as a microprocessor with separate memory, such as the memory 320. In other examples, the electronic processor 310 may be implemented as a microcontroller (with memory 320 on the same chip). In other examples, the electronic processor 310 may be implemented using multiple processors. In addition, the electronic processor 310 may be implemented partially or entirely as, for example, a field-programmable gate array (FPGA), an applications specific integrated circuit (ASIC), and the like and the memory 320 may not be needed or be modified accordingly. In the example illustrated, the memory 320 includes non-transitory, computer-readable memory that stores instructions that are received and executed by the electronic processor 310 to carry out the functionality of the access control server 130 described herein. The memory 320 may include, for example, a program storage area and a data storage area. The program storage area and the data storage area may include combinations of different types of memory, such as read-only memory and random-access memory. In some examples, the access control server 130 may include one electronic processor 310, and/or a plurality of electronic processors 310 in a cloud computer cluster arrangement, one or more of which may be executing none, all, or a portion of the applications of the access control server 130 provided below, sequentially or in parallel across the one or more electronic processors 310. The one or more electronic processors 310 comprising the access control server 130 may be geographically co-located or may be separated by inches, meters, kilometers or miles, and interconnected via electronic and/or optical interconnects. One or more proxy servers or load balancing server may control which one or more electronic processors 310 perform any part or all of the applications provided below. In some examples, the access control server 130 and the monitoring server 140 are implemented together within a cloud computer cluster arrangement.

The transceiver 330 enables wired and/or wireless communication of the access control server 130 with the plurality of access devices 120 and the monitoring server 140 over the communication network 150. In some examples, the transceiver 330 may comprise separate transmitting and receiving components. The input/output interface 340 may include one or more input mechanisms (for example, a touch pad, a keypad, and the like), one or more output mechanisms (for example, a display, a speaker, and the like), or a combination thereof, or a combined input and output mechanism such as a touch screen.

The memory 320 stores applications that are executed by the electronic processor 310. In the example illustrated, the memory 320 stores an access identification (ID) database 360. The access ID database 360 stores user IDs associated with the access control server 130. For example, when a user ID is provided to an access device 120 (for example, an ID card is scanned), the access device 120 transmits a request (which includes the user ID) to the access control server 130. The access control server 130 then determines whether the user ID is stored in the access ID database 360. If the user ID is stored in the access ID database 360, the access control server 130 transmits a signal to the access device 120 to unlock a door or otherwise allow access to a restricted area. If the user ID is not stored in the access ID database 360, the access control server 130 transmits a signal to the access device 120 to keep the door locked. In some examples, if the user ID is not stored in the access ID database 360, the access control server 130 ignores the request from the access device 120. The electronic processor 310 implements the access ID database 360, among other databases and applications stored in the memory 220, to perform the methods described herein.

In the example illustrated in FIG. 3, a single device is illustrated as including all the components and the applications of the access control server 130. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the access control server 130 are implemented in a cloud infrastructure accessible through several terminal devices, with the processing power located at a server location. In another example, the components and applications of the access control server 130 may be divided between separate monitoring facility computing devices co-located at a monitored facility of the monitored area. In yet another example, the components and applications of the access control server 130 may be divided between separate computing devices not co-located with each other but communicatively connected with each other over a suitable communication network.

Figure 4:
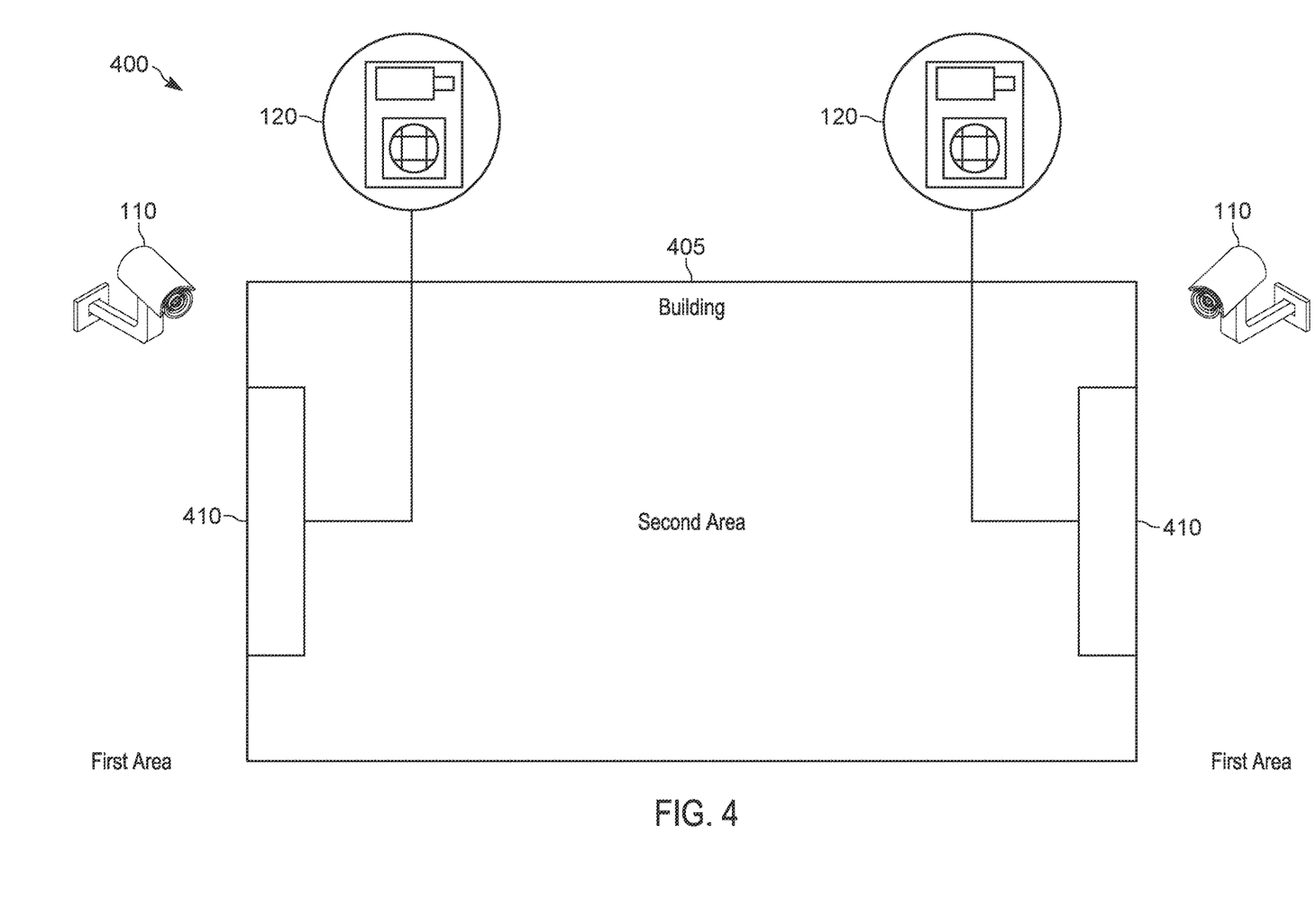
FIG. 4 is a diagram of an example monitored area in accordance with some examples.

The monitoring system 100 may be implemented, for example, within a building security system. FIG. 4 provides a monitored area 400 (for example, a first area) including a building 405. Non-limiting examples of the building 405 include a residential building, a factory, a workspace, a school, a store, an office building, a dormitory, and the like. The plurality of image sensors 110 are situated around the exterior of the building 405. In some instances, image sensors 110 may also be situated within the building 405. Image and/or video feeds of the exterior of the building 405 are provided to the monitoring server 140. The monitoring server 140 may execute the image processing application 260 to determine visual characteristics of objects of interest within the monitored area 400. Visual characteristics may be, for example, hair style, hair color, clothing, and the like.

An access device 120 is provided at each entrance 410 to the building 405. Initially the entrance 410 may be locked. To enter the building 405, a person of interest (for example, an object of interest or an operator) scans an identification (ID) card, a mobile device, or other form of identification. If an identification number associated with the form of identification is stored in the access ID database 360, the entrance 410 unlocks, allowing the person of interest to enter.

However, when the person of interest enters the building 405 (for example, enters a second area, enters an unmonitored area), the person of interest may no longer be in the view of the plurality of image sensors 110. While in the building 405, a visual appearance of the person of interest may change, such as a change of clothes. Accordingly, when the person of interest exits the building 405 returns to the monitored area 400, the monitoring server 140 does not detect that the person of interest is the same person of interest that previously entered the building 405. However, examples described herein combine the functions of the monitoring server 140 and the access control server 130 to associate the visual characteristics of the person of interest with the entering and exiting of an unmonitored area.

In some instances, rather than scanning an identification card, a mobile device of a person of interest provides a user ID to a nearby access device 120. For example, when the mobile device is within range of an access device 120, the mobile device provides a user ID to the access device 120 via a Radio Frequency Identification (RFID) tag, a Bluetooth signal, a Near-Field Communication (NFC) signal, or a similar short-distance communication protocol. The access device 120 then provides the user ID to the access control server 130 to determine whether to allow access to the building 405. Additionally, when the person of interest exits the building 405, the mobile device once again provides the access device 120 with the user ID when the mobile device and the access device 120 are within communication range. In some examples, to detect that the mobile device is within range of the access device 120, the access device 120 (for example, continuously or periodically) transmits a request signal. Upon receiving the request signal, the mobile device broadcasts the user ID. In other examples, the mobile devices continuously broadcasts the user ID. When the mobile device is within communication range of the access device 120, the access device 120 detects the broadcast.

Figure 5:
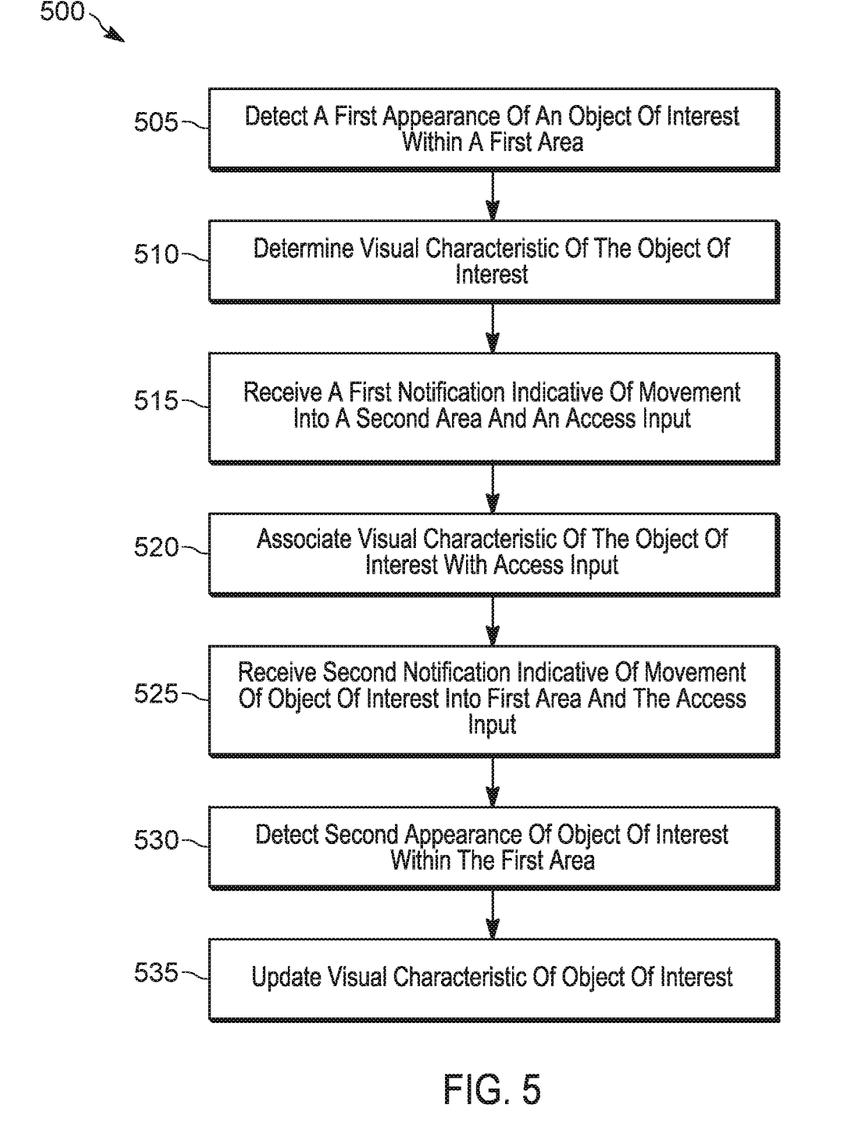
FIG. 5 is a flowchart of a method for identifying a changed object of interest after an object of interest has accessed an unmonitored area in accordance with some examples.

FIG. 5 illustrates one example method 500 for updating visual characteristics of an object of interest. The method 500 is described as being executed by the electronic processor 210. However, in some examples, aspects of the method 500 is performed by another device. For example, the method 500 may be performed by the electronic processor 210 of the monitoring server 140 in conjunction with the electronic processor 310 of the access control server 130.

At block 505, the electronic processor 210 detects a first appearance of an object of interest within a first area. For example, with reference to FIG. 6A, a first object of interest 605 enters a monitored area 600. The plurality of image sensors 110 provides the monitoring server 140 with images and/or video feed of the object of interest 605. The monitoring server 140 executes the appearance detection application 270 to detect the object of interest 605 has entered the monitored area 600.

Figure 6A:
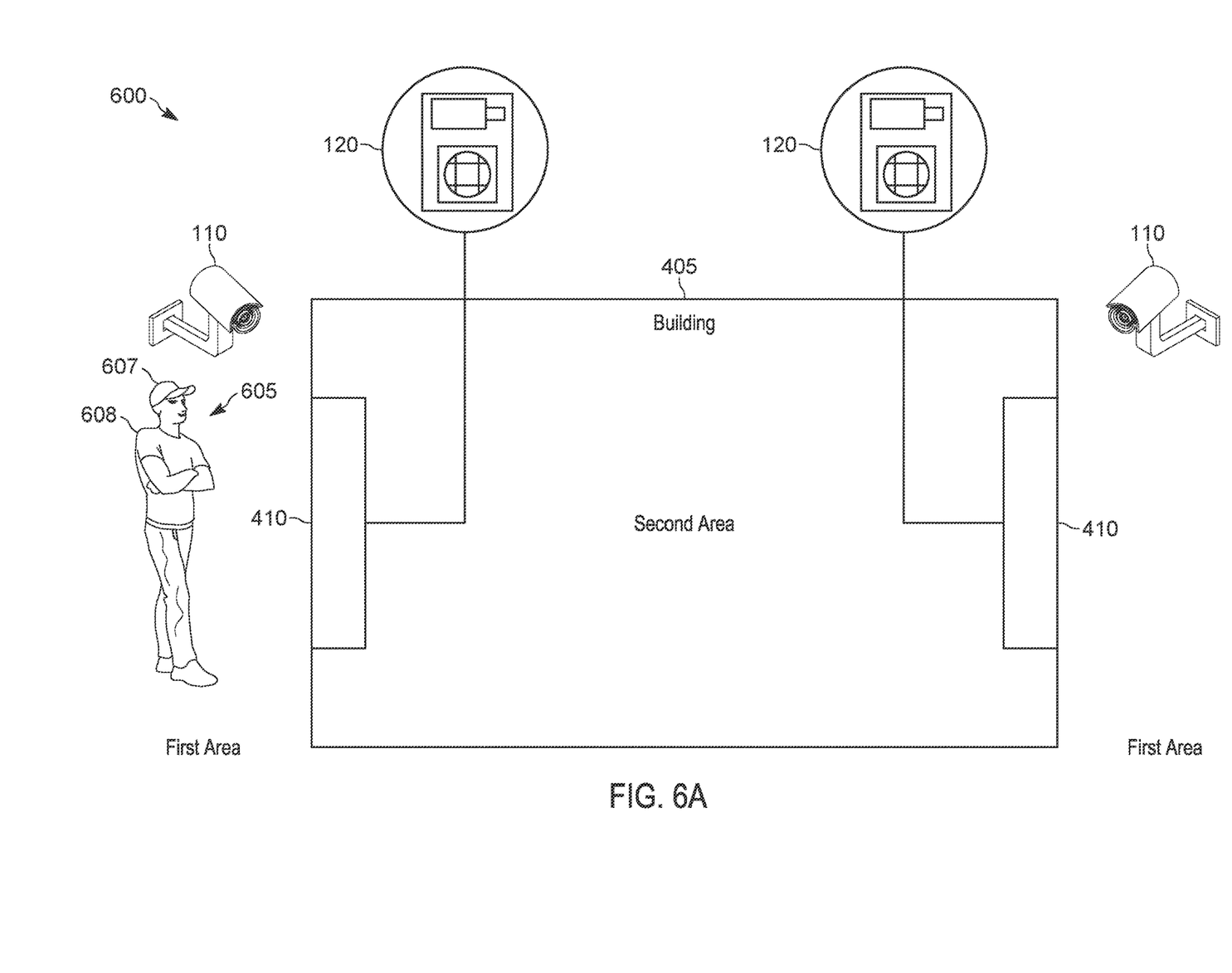
FIGS. 6A-6B illustrate a use case of the method of FIG. 4 in accordance with some examples.

At block 510, the electronic processor 210 determines visual characteristics of the object of interest 605. For example, the electronic processor 210 executes the image processing application 260 and uses facial recognition or image recognition techniques to extract visual characteristics of the objected of interest. In the example of FIG. 6A, the object of interest 605 includes a first headwear 607 and first clothing 608 which may be identified as visual characteristics by the electronic processor 210. In some examples, the electronic processor 210 assigns a unique identifier to the object of interest. The visual characteristics and the unique identifier are then stored in the memory 220.

At block 515, the electronic processor 210 receives a first notification indicative of movement into a second area and an access input. For example, the object of interest 605 provides a user ID to the access device 120 using an ID card, a mobile device, or the like. The object of interest 605 then enters the building 405 and enters the second area (for example, the unmonitored area). The electronic processor 210 may detect, by executing the appearance detection application 270, that the object of interest 605 is no longer in the first area (for example, the monitored area 600). Additionally, upon receiving the user ID, the access control server 130 provides the user ID to the monitoring server 140.

At block 520, the electronic processor 210 associates the visual characteristics of the object of interest 605 with the access input. For example, the identified first headwear 607 and the first clothing 608 are associated with the user ID provided by the access control server 130.

Figure 6B:
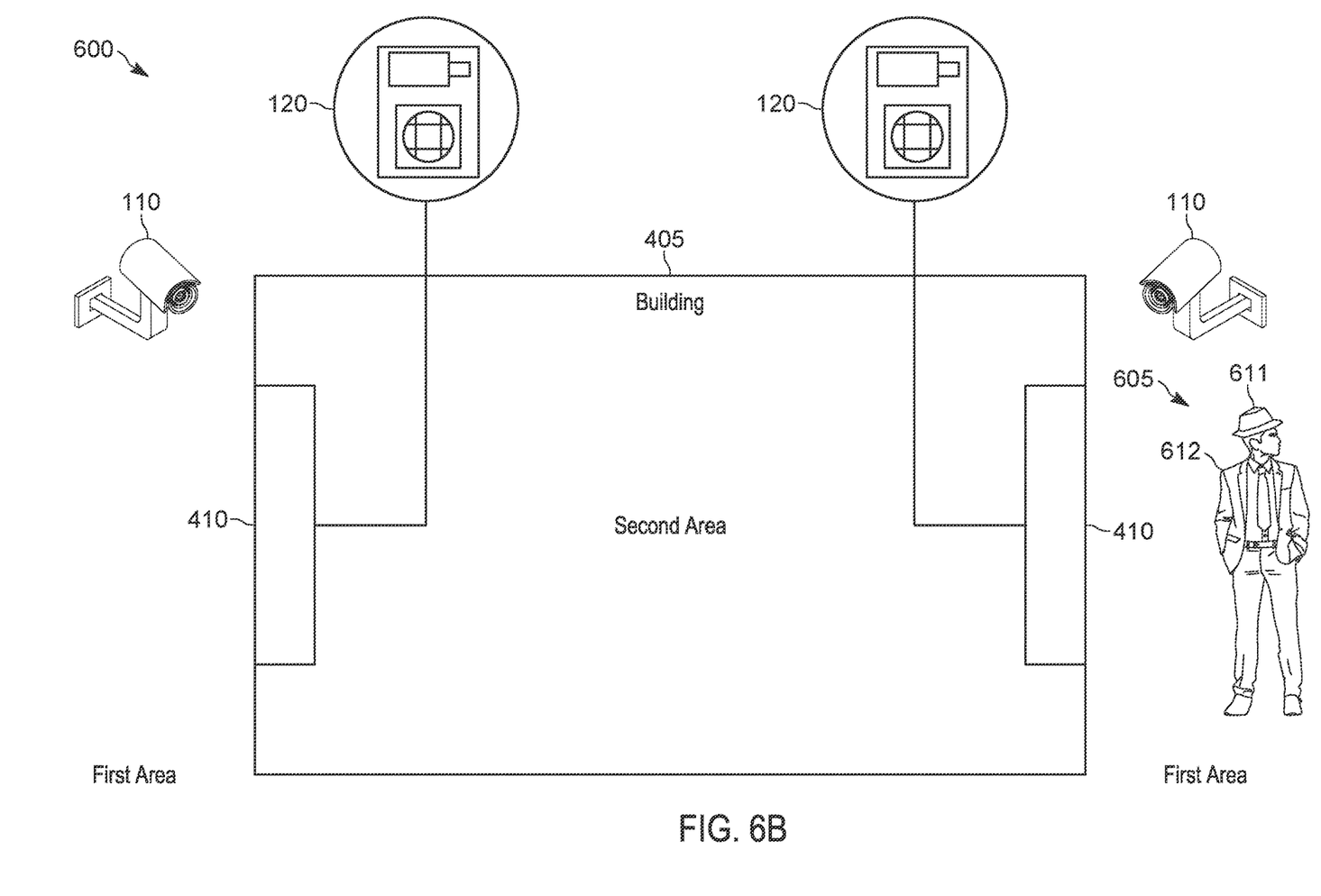

At block 525, the electronic processor 210 receives a second notification indicative of movement of the object of interest 605 into the first area and the access input. For example, as shown in FIG. 6B, the object of interest 605 exits the building 405 and returns to the monitored area 600. When exiting the building 405, the user ID is provided to the access device 120. The access device 120 transmits the user ID to the access control server 130. The access control server 130 then transmits the user ID to the monitoring server 140, indicating that the object of interest 605 has exited the building 405.

At block 530, the electronic processor 210 detects a second appearance of the object of interest 605 within the first area. For example, the plurality of image sensors 110 provides the monitoring server 140 with images and/or video feed of the object of interest 605. The electronic processor 210 executes the appearance detection application 270 to detect that the object of interest 605 is within the monitored area 600.

At block 535, the electronic processor 210 updates the visual characteristic of the object of interests. For example, upon receiving the user ID from the access control server 130, the electronic processor 210 associates the user ID with the new appearance of the object of interest 605. The electronic processor 210 then obtains the initial visual characteristics of the object of interest 605 from the memory 220. The electronic processor 210 executes the image processing application 260 to obtain an updated visual characteristics of the object of interest 605. In the example of FIG. 6B, the visual characteristics include second headwear 611 and second clothing 612. The electronic processor 210 then stores the updated visual characteristics in the memory 220.

Figure 7:
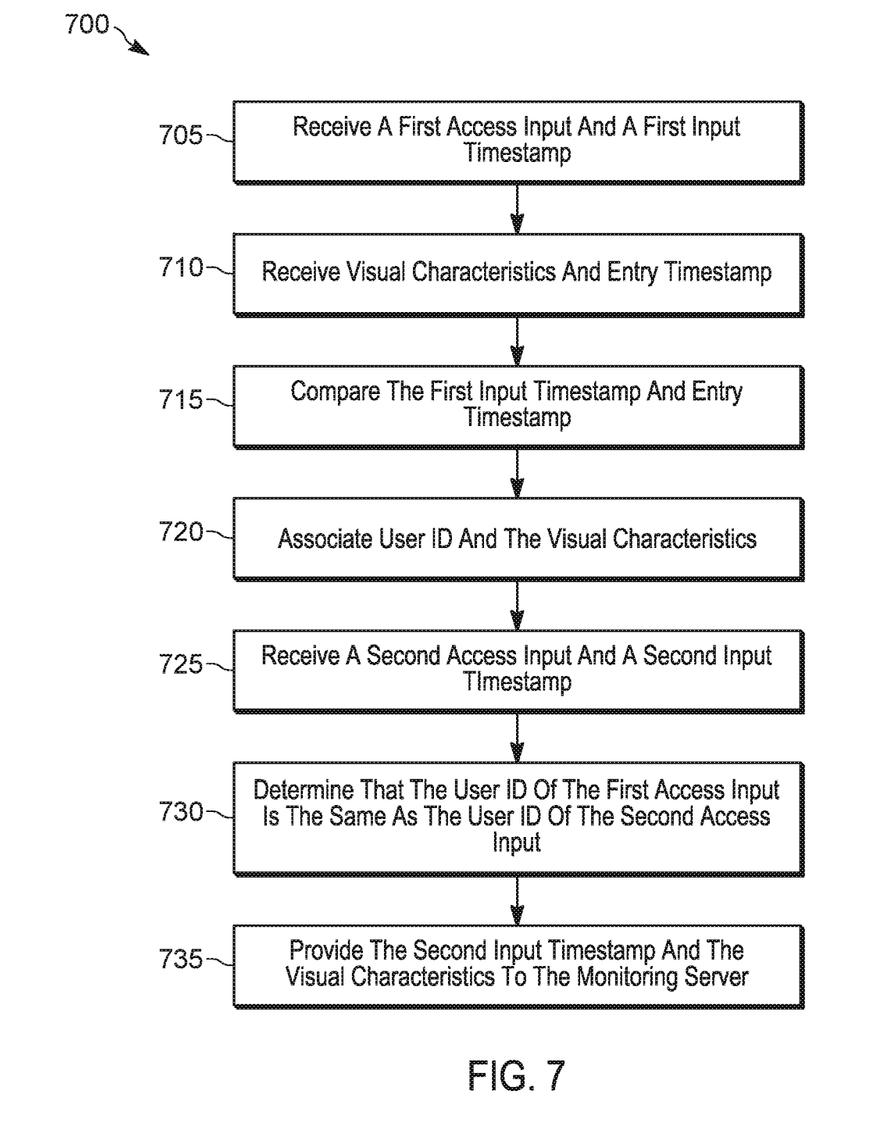
FIG. 7 is a flowchart of a method for associating an access input and visual characteristics of an object of interest in accordance with some examples.

In another example, the electronic processor 310 of the access control server 130 associates the visual characteristics of the object of interest 605 with the access input. FIG. 7 illustrates one example method 700 for associating the visual characteristics of the object of interest 605 with the access input. The method 700 is described as being executed by the electronic processor 310. However, in some examples, aspects of the method 500 is performed by another device. For example, the method 700 may be performed by the electronic processor 310 of the access control server 130 in conjunction with the electronic processor 210 of the monitoring server 140.

At block 705, the electronic processor 310 receives a first access input and a first input timestamp. For example, with reference to FIG. 6A, the object of interest 605 provides a user ID to the access device 120 using an ID card, a mobile device, or the like. The electronic processor 310 determines a time at which the user ID was received. The time at which the user ID was received is stored as a first input timestamp in the memory 220. At block 710, the electronic processor 310 receives visual characteristics of the object of interest 605 and an entry timestamp. For example, the monitoring server 140 transmits the visual characteristics of the object of interest 605 to the access control server 130. Additionally, upon detecting that the object of interest 605 has entered the building 405 and is no longer in the monitored area 600 (such as at block 515 of FIG. 5), the monitoring server 140 transmits an entry timestamp indicative of the time at which the object of interest 605 entered the building 405 to the access control server 130.

At block 715, the electronic processor 310 compares the first input timestamp and the entry timestamp. For example, the electronic processor 310 determines a difference in time between the first input timestamp and the entry timestamp. The difference in time between the first input timestamp and the entry timestamp are compared to a predetermined time threshold stored in the memory 320 (for example, 5 seconds, 10 seconds, or the like). If the difference in time between the first input timestamp and the entry timestamp is less than the time threshold, the electronic processor 310 associates the user ID and the visual characteristics (at block 720). The user ID and the visual characteristics are then associated within the memory 320. If the difference in time between the first input timestamp and the entry timestamp is greater than the time threshold, the electronic processor 310 determines that the access input and the object of interest 605 are not associated.

At block 725, the electronic processor 310 receives a second access input and a second input timestamp. For example, with reference to FIG. 6B, the object of interest 605 exits the building 405. As the object of interest 605 exits the building 405, the user ID is once again provided to the access device 120. Additionally, the electronic processor 310 determines the time at which the user ID was received. The time at which the user ID was received is stored as a second input timestamp in the memory 220.

At block 730, the electronic processor 310 determines whether the user ID received from the first access input is the same as the user ID received from the second access input. If the user IDs are the same, at block 735, the electronic processor 310 provides the second input timestamp and the visual characteristics of the object of interest 605 to the monitoring server 140. In some examples, the monitoring server 140 then uses the second input timestamp to detect the second appearance of the object of interest 605 within the first area, as described with respect to block 530 of FIG. 5.

Figure 8:
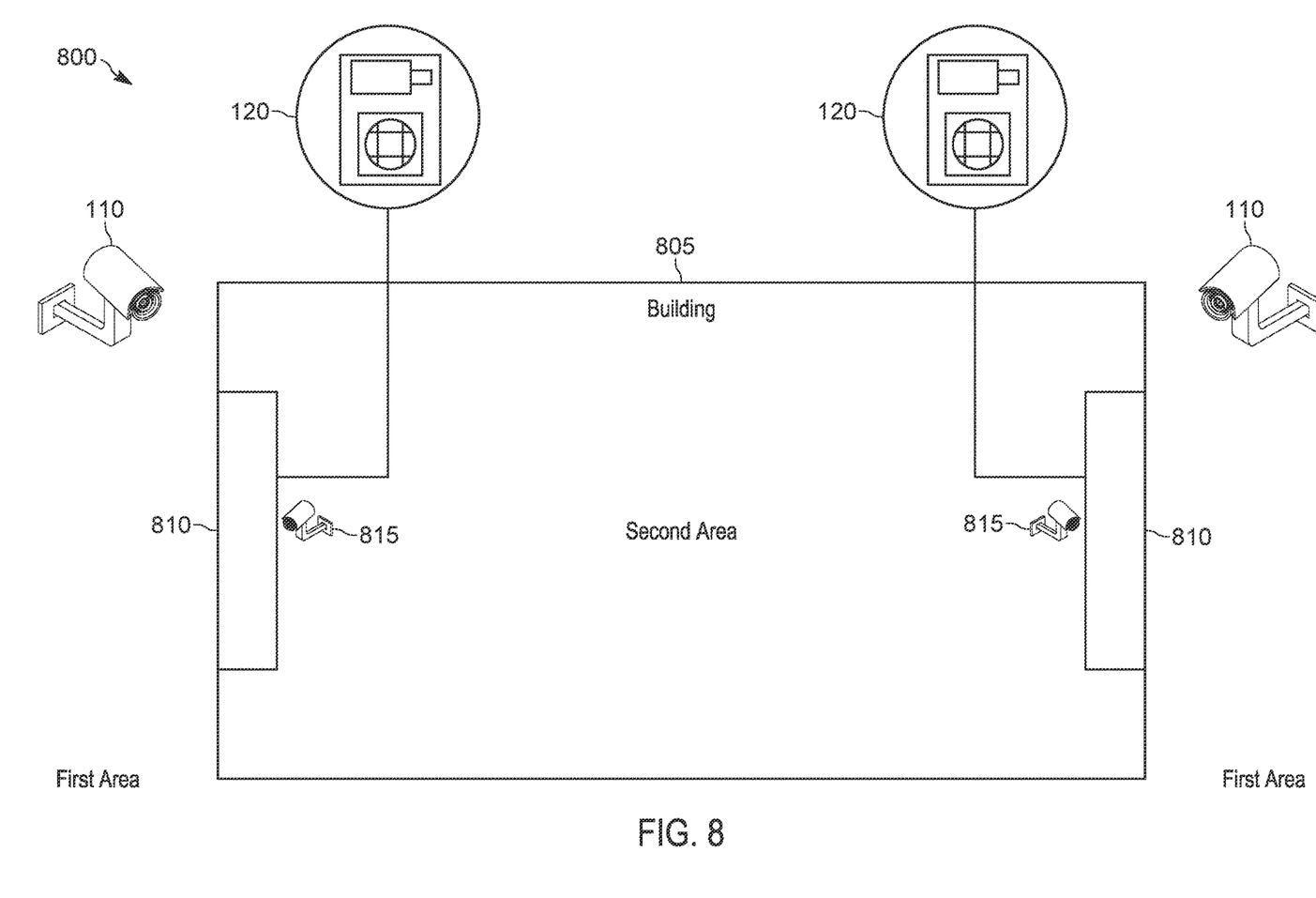
FIG. 8 illustrates another example use case of the method of FIG. 4 in accordance with some examples.

In some instances, portions of the building 405 may have image sensors, for example, one or more cameras located at the entrances 410. For example, FIG. 8 provides an example monitored area 800 including a building 805. The building 805 has entrances 810 (for example, a third area). Each entrance includes an access device 120 and a building image sensor 815. The building image sensors 815 are configured to provide image and/or video feeds to the monitoring server 140, the access control server 130, or a combination thereof. When an object or person of interest exits the entrance 810 and further enters the building 805, the object of interest enters the unmonitored area (for example, the second area).

Figure 9:
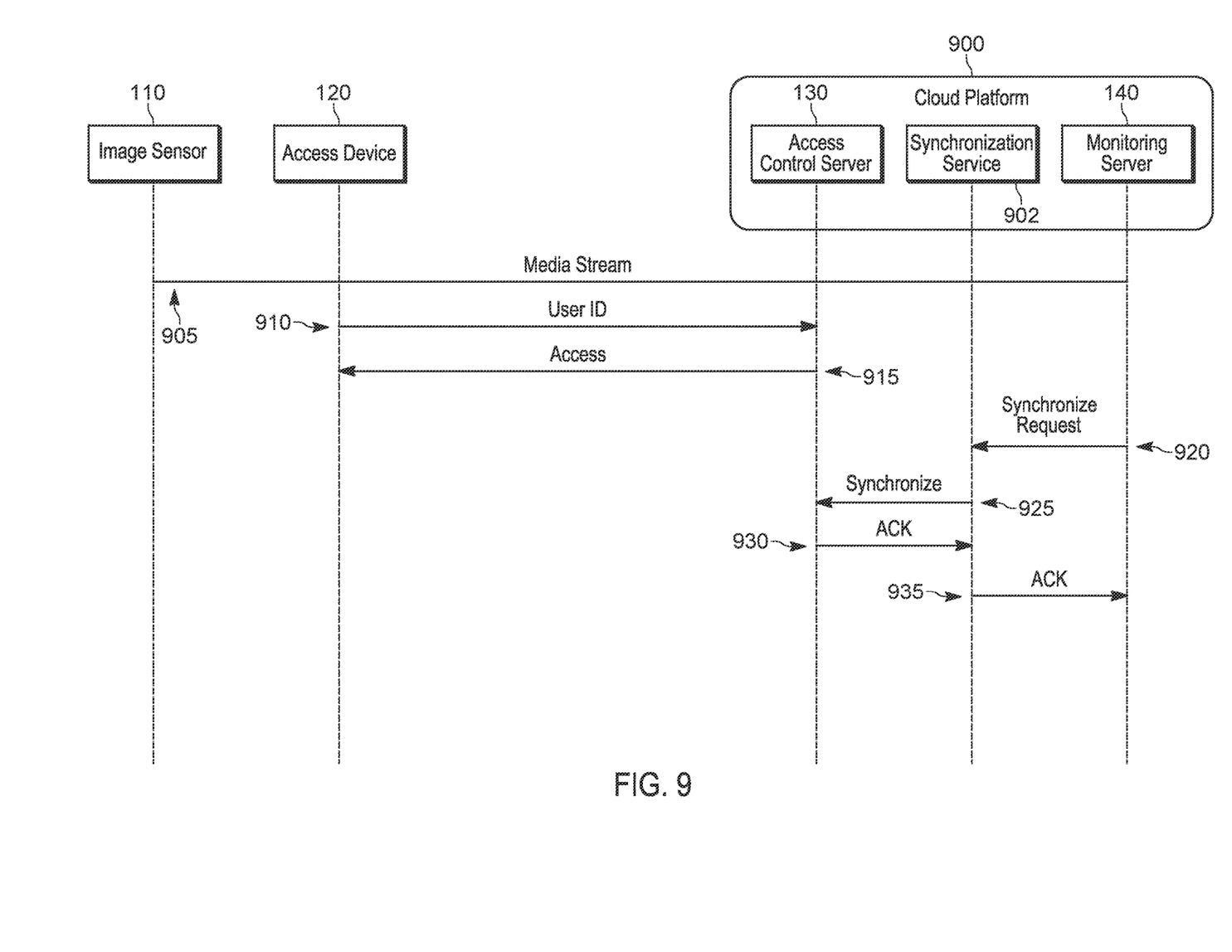
FIG. 9 illustrates examples messages transmitted within the monitoring system of FIG. 1 in accordance with some examples.

FIG. 9 illustrates example messages transmitted between the components of the monitoring system 100. In the example of FIG. 9, the access control server 130 and the monitoring server 140 are integrated within a cloud platform 900. The cloud platform 900 further includes a synchronization service 902 configured to synchronize communication between the access control server 130 and the monitoring server 140.

At step 905, an image sensor 110 provides a media stream to the monitoring server 140. For example, the image sensor 110 provides a video and/or an image stream to the monitoring server 140, as previously described.

At step 910, an access device 120 transmits a user ID to the access control server 130. For example, the access device 120 first receives a user ID from an identification card, a mobile device, or the like. At step 915, if the user ID is stored in the access ID database 360, the access control server 130 transmits an access signal to the access device 120. The access device 120 may then permit access to a restricted area.

In some instances, the monitoring server 140 must link with, or otherwise initiate communication with, the access control server 130 prior to transmitting information (such as the visual characteristics, entry timestamps, and the like). The synchronization service 902 assists with synchronizing the monitoring server 140 and the access control server 130 to establish such a communication link. For example, at step 920, the monitoring server 140 transmits a synchronization request to the synchronization service 902. At step 925, the synchronization service 902 transmits a synchronize signal to the access control server 130. The synchronize signal may, for example, set a value of a clock associated with the access control server 130, provide an address of the monitoring server 140, or the like. At step 930, the access control server 130 transmits an acknowledgement (ACK) signal to the synchronization service 902. The ACK signal indicates that the synchronization was successful. At step 935, the synchronization service 902 provides transmits the ACK signal to the monitoring server 140.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

We claim:

1. A monitoring system comprising:
an image sensor configured to monitor a first area, and
a first electronic processor configured to be coupled to the image sensor and to:
  detect, using the image sensor, a first appearance of an object of interest within the first area;
  determine a first visual characteristic of the object of interest during the first appearance;
  receive a first notification indicative of movement of the object of interest into a second area and an access input;
  associate the first visual characteristic of the object of interest with the access input to generate a stored visual characteristic;
  receive a second notification indicative of movement of the object of interest out of the second area to the first area;
  detect, using the image sensor, a second appearance of the object of interest within the first area;
  determine a second visual characteristic of the object of interest during the second appearance; and
  update the stored visual characteristic of the object of interest based on the second appearance of the object of interest,
wherein the first visual characteristic is visually distinct from the second visual characteristic.

2. The monitoring system of claim 1, wherein the first electronic processor is further configured to establish a link to an access control system that is responsive to the access input.

3. A monitoring system comprising:
an image sensor configured to monitor a first area,
an access control system configured to provide access to a second area in response to receiving an access input;
a first electronic processor configured to be coupled to the image sensor and to:
  detect, using the image sensor, a first appearance of an object of interest within the first area;
  determine a first visual characteristic of the object of interest during the first appearance;
  establish a communication link to the access control system;
  receive a first notification indicative of movement of the object of interest into the second area and the access input;
  associate the first visual characteristic of the object of interest with the access input to generate a stored visual characteristic;
  receive a second notification indicative of movement of the object of interest out of the second area to the first area;
  detect, using the image sensor, a second appearance of the object of interest within the first area;
  determine a second visual characteristic of the object of interest during the second appearance; and
  update the stored visual characteristic of the object of interest based on the second appearance of the object of interest,
wherein the first visual characteristic is visually distinct from the second visual characteristic.

4. The monitoring system of claim 3, wherein the access control system includes a second electronic processor, the second electronic processor configured to:

receive, from the first electronic processor, the visual characteristic of the object of interest; and associate the visual characteristic of the object of interest with the access input.

5. The monitoring system of claim 4, wherein the first electronic processor is further configured to transmit a timestamp to the second electronic processor, wherein the timestamp indicates a time at which the first notification indicative of movement was received.

6. The monitoring system of claim 3, further comprising a second image sensor configured to monitor the first area, and wherein, to detect the second appearance of the object of interest within the first area, the first electronic processor is configured to detect, using the second image sensor, the second appearance of the object of interest within the first area.

7. The monitoring system of claim 3, further comprising a second image sensor configured to monitor a third area, and wherein the first electronic processor is further configured to:

detect, using the second image sensor, a third appearance of the object of interest within the third area; and update the visual characteristic of the object of interest based on the third appearance of the object of interest.

8. The monitoring system of claim 3, wherein the first electronic processor is further configured to store the visual characteristic of the object of interest in a memory.

9. The monitoring system of claim 3, wherein the access input includes a user identification received from one selected from the group consisting of a user identification card, an RFID tag, a Bluetooth signal, and an NFC signal.

10. A method of monitoring an object of interest, the method comprising:

detecting, using an image sensor, a first appearance of an object of interest within a first area;

determining a first visual characteristic of the object of interest during the first appearance;

receiving a first notification indicative of movement of the object of interest into a second area and an access input;

associating the first visual characteristic of the object of interest with the access input to generate a stored visual characteristic;

receiving a second notification indicative of movement of the object of interest out of the second area to the first area;

detecting, using the image sensor, a second appearance of the object of interest within the first area;

determining a second visual characteristic of the object of interest during the second appearance; and updating the stored visual characteristic of the object of interest based on the second appearance of the object of interest, wherein the first visual characteristic is visually distinct from the second visual characteristic.

11. The method of claim 10, further comprising:

establishing a link to an access control system that is responsive to the access input.

12. The method of claim 11, further comprising:

receiving, with the access control system, the visual characteristic of the object of interest; and associating, with the access control system, the visual characteristic of the object of interest with the access input.

13. The method of claim 11, further comprising:

receiving, with the access control system, a timestamp, wherein the timestamp indicates a time at which the first notification indicative of movement was received.

14. The method of claim 10, further comprising:

detecting, using a second image sensor, a third appearance of the object of interest within a third area; and updating the visual characteristic of the object of interest based on the third appearance of the object of interest.

15. The method of claim 10, further comprising:

storing the visual characteristic of the object of interest in a memory.

* * * * *